(12) United States Patent
Patterson

(10) Patent No.: US 8,757,321 B2
(45) Date of Patent: Jun. 24, 2014

(54) LONG REACH APPARATUS

(75) Inventor: Richard Wayne Patterson, Duvall, WA (US)

(73) Assignee: SSA Terminals (Long Beach) LLC, Long Beach, CA (US)

( * ) Notice: Subject to any disclaimer, the term of this patent is extended or adjusted under 35 U.S.C. 154(b) by 36 days.

(21) Appl. No.: 13/312,408

(22) Filed: Dec. 6, 2011

(65) Prior Publication Data

US 2013/0140422 A1 Jun. 6, 2013

(51) Int. Cl.
*E04G 3/00* (2006.01)

(52) U.S. Cl.
USPC .............................. 182/82; 248/539; 248/351

(58) Field of Classification Search
USPC ................... 248/539, 354.3; 52/125.4, 127.2; 81/177.75; 182/82
See application file for complete search history.

(56) References Cited

U.S. PATENT DOCUMENTS

| | | | |
|---|---|---|---|
| 1,227,312 A | 5/1917 | Rear | |
| 3,420,334 A | 1/1969 | Talbot | |
| 3,798,856 A * | 3/1974 | Gloskowski | 52/127.2 |
| 3,853,202 A | 12/1974 | Jarboe | |
| 3,955,644 A * | 5/1976 | Steele | 182/82 |
| 4,075,913 A * | 2/1978 | Tye | 81/177.75 |
| 4,078,633 A * | 3/1978 | Fahy | 182/82 |
| 4,396,092 A * | 8/1983 | Thompson | 182/38 |
| 4,525,006 A * | 6/1985 | Nowak et al. | 294/174 |
| 4,629,032 A * | 12/1986 | Armstrong | 182/9 |
| 4,641,399 A | 2/1987 | Jackson | |
| 5,042,888 A * | 8/1991 | Shinjo | 411/54 |
| 5,127,757 A * | 7/1992 | Langer | 403/49 |
| 5,207,527 A * | 5/1993 | Duncan et al. | 403/246 |
| 5,390,970 A | 2/1995 | Gray | |
| D369,962 S * | 5/1996 | Moore | D8/51 |
| 5,525,000 A | 6/1996 | Belobraydich et al. | |
| 5,566,998 A | 10/1996 | Gray | |
| 5,954,589 A | 9/1999 | Masters | |
| 6,453,776 B1 | 9/2002 | Beattie et al. | |
| 6,929,555 B2 | 8/2005 | Morton | |
| 7,861,469 B2 * | 1/2011 | Heady et al. | 52/127.2 |
| 7,975,803 B2 * | 7/2011 | Schwoerer | 182/178.1 |
| 8,051,615 B2 * | 11/2011 | Mathews et al. | 52/223.13 |
| 8,209,935 B2 * | 7/2012 | Heady et al. | 52/745.09 |
| 8,336,674 B2 * | 12/2012 | Kleppe et al. | 182/82 |
| 8,511,430 B1 * | 8/2013 | Pelini | 182/82 |
| 8,534,420 B1 * | 9/2013 | Michael | 182/82 |
| 2008/0205978 A1 | 8/2008 | Johnson et al. | |
| 2010/0012427 A1 * | 1/2010 | Julliard | 182/82 |
| 2010/0193291 A1 * | 8/2010 | Kleppe et al. | 182/82 |
| 2012/0247870 A1 * | 10/2012 | Iturbe Beristain | 182/82 |

FOREIGN PATENT DOCUMENTS

GB 2196867 5/1988

* cited by examiner

*Primary Examiner* — Terrell McKinnon
*Assistant Examiner* — Daniel J Breslin
(74) *Attorney, Agent, or Firm* — Fulwider Patton LLP

(57) ABSTRACT

An elongated pole having a tool mounted to one extremity, a hanger mounted medially and a handle device pivotally mounted to the opposite extremity.

12 Claims, 4 Drawing Sheets

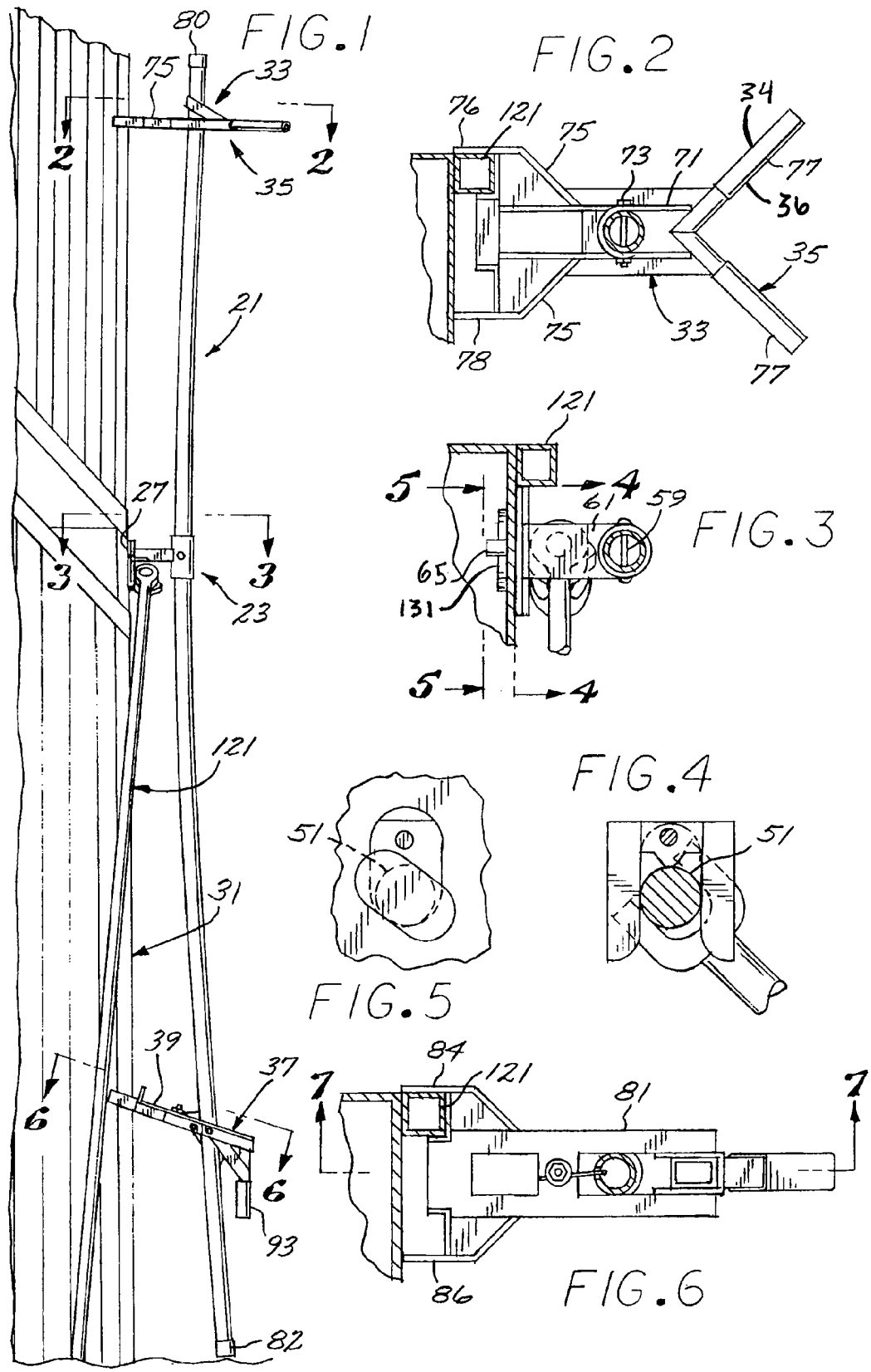

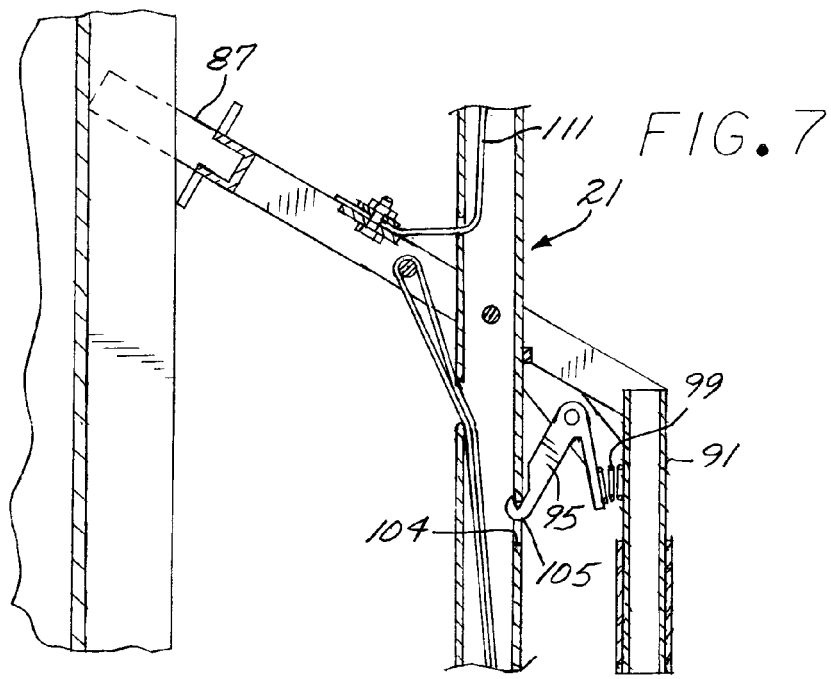
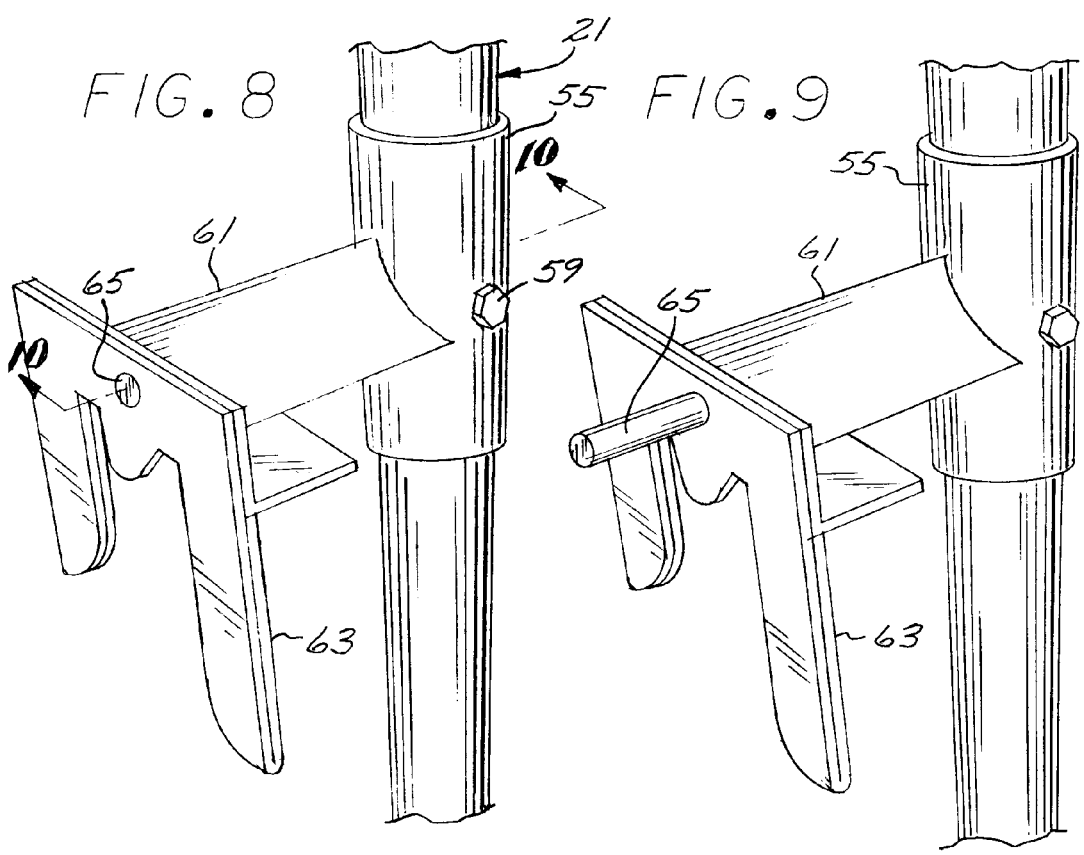

LONG REACH APPARATUS

BACKGROUND OF THE INVENTION

The present invention relates to a device for facilitating the reach to a distant point on a working surface.

DESCRIPTION OF THE PRIOR ART

Workmen are often challenged with reaching a distant location for performing a work project, such as working with the surface of a wall, securing an item from a distant location or securing a fastener in place. One area that has posed a particular challenge is in the lashing together of freight cargo containers stacked on top of one another for transportation on a freight carrier such as a ship or train.

In reaching distant locations, a long slender tool may be involved which may be quite unwieldy for the workman and may be on the order of 10, 15, 20 or 30 feet in length and must be raised from a lower position to an elevated position, often times resulting in the tool becoming unbalanced to one side or the other and thus applying awkward loads to the workman maneuvering the tool requiring him or her to resist in a manner which may apply injurious loads, such as torques and twists to the workman's back and joints. This can result in strains or other painful injuries to the workman. This is particularly true in the should joint and back area. It is recognized that the shoulder joint is a relatively complicated joint composed of three bones, the clavicle, scapula and the humerus. It is recognized that shoulders are the most movable joints in the body and can be unstable because the ball of the upper arm is larger than the shoulder socket intended to hold it in position. The shoulder is anchored by muscles, tendons and ligaments which can be stretched and strained. Because the joint is inherently unstable, it is the site of many common injuries. Such injuries can arise when a workman holding a long reaching tool encounters an unbalance or uneven loading to be counteracted by the workman thereby all too frequently resulting in strains, sprains, dislocations, separations, tendonitis, bursitis, torn rotor cuffs, frozen shoulders, fractures and, over time even arthritis in the joint.

It is recognized that other body areas often subjected to injury is the mid or lower back. The back is constructed of complicated bones, muscles and tissues extending from the neck to the pelvis. When a long tool, balanced in a somewhat vertical direction becomes unevenly loaded or tilted to one side, the lower back of the workman holding the tool can be subjected to uneven and heavy loads which can result in sprains or strains, herniated discs and even fractured vertebrae causing pain and limiting movement of the workman. These injuries often result in lost work time and can result in restricting the workman's future work duties and restrict his or her enjoyment of life.

One area where distant, and often elevated work points, comes into play is on cargo container ships. Container ships have become particularly popular in recent time and due to the increased commercial activity have grown in size. As recognized by those skilled in the art, cargo is carried on ships in bulk like grain or coal and is transported unpackaged in a hollow ship, generally in large volumes. Break-bulk cargo, on the other hand, which may be manufactured goods, are typically transported in packages. Before the advent of containerization in the 1950's break-bulk items were loaded, and lashed and unloaded from the ship one piece at a time. However, by grouping cargo into containers, 1000 to 3000 cu ft. of cargo or up to 64,000 lbs. is moved at once and each container is secured to the ship in a standardized way. Containerization has increased the efficiency of moving traditional break-bulk cargo significantly such that by the beginning of this century more than 90% of the world trade in non-bulk goods is transported in ISO containers. In 2009, almost one quarter of the world's dry cargo was shipped by container, an estimated 1.19 billion metric tons of cargo. Container ships are distinguished into 7 major categories: small feeder, feeder, feedermax, panamax, post-panamax, new panamax and ultra-large. While containers may be carried by conventional break-bulk ships cargo holds for dedicated container ships are specially constructed to speed loading and unloading. In the larger container cargo ships containers are stacked on one another for stowage inside the holds and above deck with extra support and complicated fastening systems. There are three types of fastening systems in use: lashing systems, locking systems and buttress systems. Lashing systems secure containers to the ship using devices made from wire rope, rigid rods, chains and devices to tension the lashings, such as turnbuckles. The effectiveness of lashings is increased by securing containers to each other, either by simple metal forms (such as stacking cones) or complicated device such twist-lock stackers to lock containers together. A particular application for the tool of the present invention is in the lashing of stacked deck containers together to prevent or limit movement while the vessel is under way and until it reaches port in preparation for offloading. The lashing can involve lashing poles of somewhat significant weight in order to effectively secure the containers in position. Secure lasing is important as it is estimated that container ships lose between 2,000 and 10,000 containers at sea each year, costing $370,000,000 per year and up. It is a problem that containers dropped overboard immediately become an environmental threat—termed "marine debris". Thus, it is important to secure the containers together with a relatively robust lashing system and this can become somewhat challenging for containers that may be stacked 2, 3 and 4 elevations above the dock or deck where the workman is located.

A system for lashing cargo containers together which has gained a great degree of popularity are long, somewhat rigid, lashing poles having hooks on the top ends thereof such that the workman may grasp the poles and elevate them to an extended overhead position sometimes extending 10, 12, 15, 20 or 30 feet above the dock to hook into an opening at the top of a container to thus be drawn down apply and typically diagonally across the container to secure the opposite end to a far side of the lower container, or to the deck of the ship itself so that a turnbuckle connected thereto might be tightened to lash the container securely in position cooperating with a diagonal lashing pole extending between the opposite corners of the container.

As the stacks of containers have become taller and taller, workmen have been faced with greater and greater challenges in making the connection of the hook on the upper end of the lashing pole to the opening in the container as the poles have necessarily become longer. The length of the poles thus add considerable weight to the overall lashing pole, much of which is incorporated in the upper extremities of the poles themselves whereby any leaning or imbalance off center to one side or the other can result in an awkward load on the worker maneuvering the pole forcing him or her to counter the unbalance by staining back away from the unbalance thus applying heavy loads to the workman's shoulder, back and legs. This loading can apply relatively heavy forces to the workman's joints such as the shoulder, lower back, knees and hips thereby stretching the tendons and applying disruptive forces to the joints which, over time or upon shock loading, may cause injury to the workman thereby restricting his or her ability to perform the lashing task and often causing pain or injury which will interfere with the workman's enjoyment of life. Furthermore, experience has proven that hooking of the lashing pole into a small opening high on an elevated container requires some degree of skill, particularly for the longer poles, and in inclement conditions, such as in windy weather or when the ship and dock are heaving to and fro relative to one another. It is to these challenges which the present invention is directed.

SUMMARY OF THE INVENTION

The device of the present invention includes an elongated pole having a hanger mounted medially thereon with a tool on the distal end which may be a hook. The device also includes a brace on the distal extremity for bracing against the wall on which the work is to be performed. Mounted at the lower extremity of the pole is a handle device which also includes a foot which braces against the surface of the wall. In the embodiment for working with cargo containers, the working tool may include a yolk or the like for receiving a lashing pole to guide the lashing pole as it is projected upwardly to hook the hook into an opening high on a container.

BRIEF DESCRIPTION OF THE DRAWINGS

FIG. 1 is a side view of a long reach pole device of the present invention hung from the side of a stack of cargo containers.

FIG. 2 and FIG. 3 are horizontal sectional views, in enlarged scale, taken along the lines 2-2 and 3-3, respectively of FIG. 1;

FIG. 4 is a transverse sectional view, in enlarged scale, taken along the line 4-4 of FIG. 3;

FIG. 5 is a transverse sectional view, in enlarge scale, taken along the line 5-5 of FIG. 3;

FIG. 6 is a horizontal sectional view, in enlarge scale, taken along the line 6-6 of FIG. 1;

FIG. 7 is a transverse sectional view taken along the line of 7-7 of FIG. 6;

FIGS. 8 and 9 are perspective views, in enlarged scale, of a hanger incorporated in the device shown in FIG. 1.

DETAILED DESCRIPTION OF THE PREFERRED EMBODIMENTS

Figure 10:
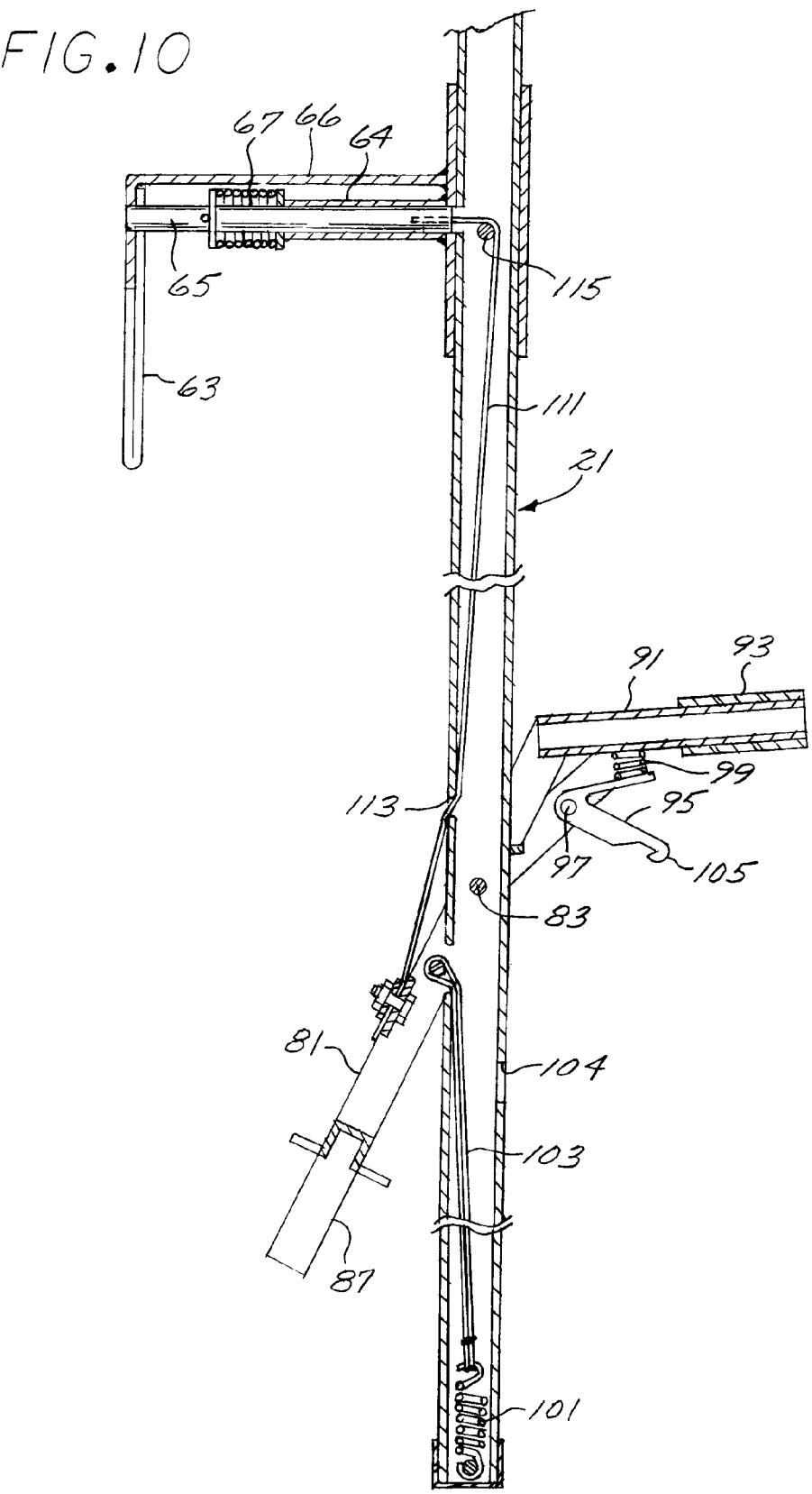
FIG. 10 is a vertical sectional view similar to FIG. 7 but showing the handle device in a retracted position.

Referring to FIGS. 1, 2 and 7, the long reach device of the present invention includes, generally, an elongated resilient pole 21 having a hanger device 23 mounted on the medial portion thereof for hooking over a receiver defined by an opening fitting 27 on the side of an elevated cargo container 31. For this application a brace device, generally designated 33, is mounted to the upper extremity of the pole 21 and includes a tool device 34 which may be in the form of a tool 36 formed by an open yoke 35 facing away from the container. Pivotally mounted to the bottom extremity of the pole is a handle device 37 which includes a foot 39 to brace against the lower portion of the container. Thus when the device is to be utilized, the pole 21 may be grasped at its lower extremity, raised to its elevated position, and the hanger hung over the fitting 27 to support the pole. The brace 33 is braced against the wall of the container as the handle device 37 is rotated from the position shown in FIG. 10 to the position shown if FIG. 7 to also brace against the container thereby cooperating with the hanger to secure the device in position. A long lashing pole (not shown) may then be elevated by the workman and the upper extremity nested into the yoke 35 in the upper area of the container so that the workman may manipulate the lashing pole about to guide it into position to hook a hook on the end of the lashing pole into an opening at the upper left corner of a cargo container thereby securing the upper portion of the lashing pole. The long reach device may then be removed from the container to free the lashing pole from the container. The lower portion of the lashing pole may then be rotated to position the lashing pole diagonally across the span of one or two containers to lash the lower end to, say the right upper corner of the lower container.

During the loading of cargo containers on a ship or the like, a gantry crane typically conveys the containers on an elevated plane out over the ship moored along a dock to then be lowered into the hold of the ship to be stacked on one another. This may continue up beyond the top deck of the ship and may result in 3, 4, 5, or 6 or more layers of cargo containers being stacked on one another above the deck. The challenge of accessing the uppermost cargo containers to lash them down presents challenges to secure a lashing without the necessity of a ladder or crane or the like moving the workman or lashing pole into position.

Cargo containers often times include vertical reinforcing ribs with some type of fitting 27 disposed up along the side walls thereof, sometime in the form of lashing pole fasteners. In this instance, the fitting 27 includes a pin 51 (FIGS. 3-5) which mounts a plate on the outer side thereof and over which the hanger device 23 may be connected.

The hanger device 23 includes an adjustable mounting device 54 depicted as a collar 55 telescope over the pole 21 and held in position by a bolt 59. Mounted to the collar 55 (FIGS. 8 and 9) is a radially projecting bracket 61 which carriers a downwardly opening hanger hook 63 on the distal end thereof. Also projecting radially of the collar 55 under such bracket is a tube 64 (FIG. 10) through which is telescoped a locking pin 65 to be retracted from the extended position shown in FIG. 9 to the retracted position shown in FIG. 8. The locking pin 65 is biased to the extended position of FIG. 9 by means of a coil spring 67 telescoped there over.

Referring to FIGS. 1 and 2, the brace device 33 includes a U-shaped strap 71 straddling the pole 21 and held in position by a nut and bolt assembly 73. Projecting toward the containers is a fan shaped foot 75 terminating in a pair of horizontally spaced apart fingers 76 and 78. The yoke 35 is formed by tubes diverging outwardly to be V-shaped in horizontal plan view to open away from the containers and conveniently includes cushion tubes 77 telescoped there over.

Referring to FIGS. 6 and 10, the handle device 37 includes, generally, an elongated fork shaped frame 81 straddling the pole 21 and mounted thereto by means of a radial pivot pin 83. Formed on the end thereof toward the cargo container is a fan shaped foot device 87 terminating in a pair of laterally spaced apart tines 84 and 86 for bracing against the side of the container and of a length sufficient to, when in the bracing position shown in FIG. 1, bend the lower extremity of the pole outwardly away from the container to cooperate in holding the pole in position. In the preferred embodiment, fingers 84 and 86 are aligned vertically below the fingers 76 and 78 (FIGS. 2 and 6).

Referring to FIG. 7, the proximal extremity of the handle device is configured with a downward projecting tube 91 forming a handle having a grip tube 93 telescoped there over. Disposed adjacent the handle is a V-shaped Bell crank shaped catch 95 to from a divergent bigger leg 96 and handle leg 98 carried from the handle device by a pivot pin 97 and biased to its extended position shown in FIGS. 7 and 10 by means of a compression coil spring 99 interposed between trigger leg 96 and the tube 91. The free end of the latch leg 98 is formed with an inwardly projecting tooth to form a latch hook 105 (FIG. 7) In one embodiment, in the latching position, the trigger leg 96 projects downwardly parallel to the handle tube 91 to be grasped by the workman as he or she grasps the handle tube 91 to rotate the latch.

Referring to FIG. 10, anchored to the interior bottom of the pole 21 is one end of a coil tension spring 101 connected on its other end to the handle device by means of a tether cable 103 to bias such handle device counterclockwise as shown in FIG. 10 to its retracted position with the foot lowered.

The wall of the pole 21 is formed below the pivot pin with an outwardly opening bore 105 positioned to receive hook 105 of the latch 95 when the handle device is in its extended bracing position shown in FIG. 7 to latch such handle device against the bias of the spring 101.

Figure 11:
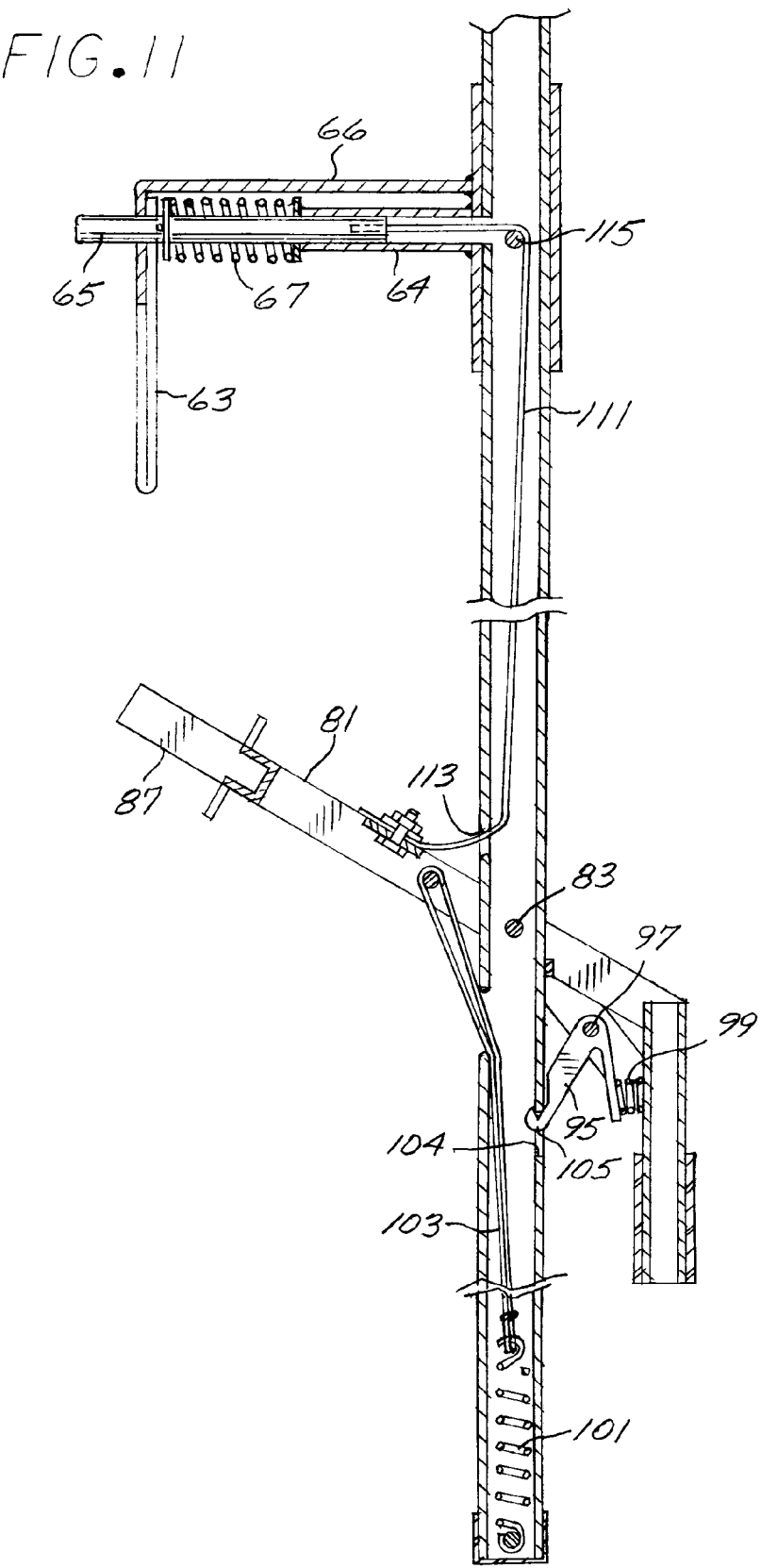
FIG. 11 is a vertical sectional view similar to FIG. 10 but showing the handle device in an extended position.

Connected between one extremity of the frame of the handle device 37 and the back end of the latch pin 65 (FIG. 11) is a cable 111 which extends from the handle device inwardly through a bore 113 in the pole above the pin 83 to extend upwardly in the pole to thread over a cross pin 115 in horizontal alignment with the latch pin 65 to then connect with such latch pin for retraction thereof when the handle device is rotated counter-clockwise to its retracted position sown in FIG. 10.

In the preferred embodiment, the pole 21 is flexible such that it may be flexed to the bowed position shown in FIG. 1 to thereby cooperate with the hanger in maintaining a bias on the respective feet 39 and 75 when they are in their bracing positions shown in FIG. 1. Conveniently the pole is capped on its top and bottom ends by plastic caps 80 and 82 (FIG. 1).

The device of the present invention may be conveniently be utilized to apply a lashing pole comparable to the lashing pole, generally designated 121 (FIG. 1), to an upper location on an elevated cargo container. It will be appreciated by those skilled in the art that cargo containers typically incorporate a fitting 27 which may include a bore 131 which I conveniently utilize to help hold the hanger 23 in position as will be described hereinafter. To this end the bore is formed with a peripheral wall defining a top edge 132 which will serve to stop the locking prior to moving upwardly thus securing the hook 63 locked in position.

In operation, containers 31 will be stacked on one another and when it is desirable to latch an upper containers to a lower container or to a ship hold, the device of the present invention may conveniently be utilized to guide a rigid latching pole into position in the upper extremities of cargo containers which may be located 2, 3, 4 or even 5 rows above the deck where the workman is located.

When the containers have been stacked, the workman may conveniently grasp the lower extremity of the device of the present invention and approach the side of the containers elevating it to a generally vertical position and conveniently locate the hanger 23 over a wall of a fitting 27 or other projection on a container to thus hook the hook 63 over such wall and over a pin 51 or the like to thereby support the weight of the device so that the workman might maneuver the upper and lower extremities thereof into position.

Referring to FIGS. 1 and 3, in the preferred embodiment, I employ the expedient of hooking the hook over a fitting adjacent a vertical rib 121 on the container. Once hooked, it will be appreciated that lower extremity of the pole may be manipulated about to align the upper extremity thereof and, accordingly, brace 33 with a protuberance, such as the vertical rib 121 (FIG. 2) on the container 32 so that drawing outwardly on the lower extremity will cause the pole to somewhat pivot about the hanger to drive the upper extremity of the pole and the foot 75 toward the container causing the one finger 76 to engage one side of a rib and abut the container wall while the other finger 78 passes the other side of the rib and also engages the side wall of the container so that, by drawing the lower extremity of the pole further outwardly, such pole will flex to hold a bias on the foot. The workman will draw the lower extremity to further outwardly provide clearance between the dock and the container for the foot 39 as the handle device 37 is rotated over center from its retracted position shown in FIG. 10 to its extended position as shown in FIG. 7. The workman may grasp the handle 91 and rotate the handle device clockwise as shown in FIG. 10 to raise the foot 81 upwardly to the position shown in FIGS. 1 and 7 and orbit the latch 95 downwardly and inwardly to engage the hook with the edge 105 of the opening 104 to latch the handle device in its extended position thus bracing it against the sidewall of the container. With the finger 84 thus aligned with the side of the rib 121 (FIG. 6) so that the tines 84 and 86 will stand the foot off from the container and maintain the pole 21 in its bowed position to cooperate with the hanger device to hold it securely in position.

As will be appreciated by those skilled in the art, as the handle device is rotated counterclockwise as shown in FIG. 10, slack will be provided in the cable 111 to allow the coil spring 67 to push the locking pin 65 outwardly to project into the bore of the container fitting 27 to thus cooperate in holding the hanger safely in position.

With the device secured in position, it will be appreciated that the workman may then grasp a lashing pole similar to the lashing pole 121 and raise it to a generally vertical position to rest the upper extremity thereof in the yolk 35 to allow the workman to maneuver it about and shift the upper extremity thereof into a location where the hook on the upper extremity of supported against the yoke to align the hook with an upwardly opening socket in the cargo container to then be drawn downwardly and hooked in place to support the weight of the lashing pole from the cargo container.

With the lashing pole hooked in place the workman may to remove the hanger device from the cargo container to move it to another position. He or she may thus grasp the handle and trigger arm 96 (FIG. 7) to rotate the latch counterclockwise as shown in FIG. 7 to unlatch it from the pole and release the handle. When unlatched the handle rod 91 may be grasped and the handle device 37 rotated counterclockwise under the assist of the spring 101 (FIG. 10) to draw the cable 111 downwardly to retract the locking pin 65 while releasing the pressure against the feet 39 and 75 and free the hanger so the pole may be elevated to unhook the hanger hook 63 from the fitting 27 to free the device to be moved over to a new location for installation of another lashing pole.

From the foregoing, it will be appreciated that the long reach working device of the present invention provides a convenient and effective means for reaching a distal working location in a safe, efficient and effective manner to thereby provide convenience for the workman and minimize the tendency for unnecessary injuries.

What is claimed is:

1. Long reach pole guide apparatus for guiding a lashing pole alongside a stack of cargo containers which includes a fitting and a bore adjacent thereto, the apparatus comprising:
   an elongated hollow flexible tube for reaching high on the container stack and including a medial section and, upper and lower extremities;

a hanger device mounted to the medial section and including a hook device for hooking over the fitting and a locking pin to project therefrom to an extended position engaging the bore;

a biasing spring biasing the locking pin to the extended position;

a guide device mounted on the upper extremity and including a foot on the one side for bracing against the wall of one of the containers and a yoke on the opposite side for receipt of a lashing pole;

an elongated handle device mounted pivotally to the lower extremity for rotating from an extended position to a retracted position and including on one end a handle and on the opposite end a brace for bracing against the side of one of a lower container;

a catch on the handle device for, when the handle is in the extended position, latching with the pole to hold the handle device in the extended position;

a biasing device for biasing the handle device to its retracted position; and a cable extending from the handle device through the interior of the tube and connected on one end with the locking pin and, on the other end with the handle device, the handle device being operable upon being rotated to its retracted position to retract the pin from its extended position.

2. The apparatus defined in claim 1 wherein:
the brace includes a pair of fingers to, when the handle device is in the extended position, project toward the containers.

3. The apparatus defined in claim 1 that includes:
a brace mounted to the upper extremity for bracing against one of the containers.

4. The apparatus defined in claim 1 wherein:
the foot includes a pair of fingers spaced horizontally apart; and
the brace includes a pair of horizontally spaced apart tines aligned vertically with the pair of fingers.

5. The apparatus defined in claim 1 wherein:
the biasing device includes a coil tension spring in the tube.

6. A long reach apparatus for use with a vertical wall including an opening defining a downwardly facing edge adjacent a fitting and comprising an elongated guide pole having top and bottom extremities, a medial section and opposite first and second sides;

a hanger device on the medial section and including a hook on the first side for releasable hooking to the fitting;

a tool device on the upper extremity, including a tool disposed on the second side;

a handle device pivotally connected to the lower extremity and pivotable from a retracted to an extended position, and including a first foot, when the handle device is in the extended position, brace against the wall;

the hanger device including a locking pin projectable to a locking position engaged below the edge when the hook is engaged with the fitting and retractable to an unlocking position; and a device on the handle device, connected to the locking pin and operable upon the handle device being rotated to the retracted position to shift the locking pin to the unlocking position.

7. The long reach apparatus for releasably mounting to a fitting on a wall and comprising:

an elongated flexible guide pole having top and bottom extremities, a medial section and opposite first and second sides;

a hanger device on the medial section and including a hook on the first side for releasable hooking to the fitting;

a tool device on the upper extremity, including a tool disposed on the second side;

a handle device pivotally connected to the lower extremity and pivotable from a retracted to an extended position, and including a first foot to, when the handle device is in the extended position, brace against the wall; and the apparatus includes a brace on the upper extremity and the brace and the first foot are constructed to, when the hanger is hooked to the fitting, the pole projecting vertically along the wall, and the handle device rotated to the extended position, flex the upper and lower extremities away from the wall.

8. Long reach lashing pole guide apparatus for releasable mounting to a fitting on a vertical wall of a cargo container of the type including a bore and comprising:

an elongated guide tube having upper and lower extremities, a medial section and opposite first and second sides;

a hanger device on the medial section, including a hook on the first extremity for releasable hooking to the fitting and a locking pin for projecting into the bore;

a coil spring for biasing the locking pin into the bore;

a retraction cable in the tube connected between the locking pin and the handle device;

an elongated tool device on the upper extremity, including a brace on the first side to brace against the wall and a tool on the second side;

a handle device pivotally mounted to the bottom extremity, including a hand-grip handle disposed on the second side, a foot on the first side and operable so a workman may grasp the handle to pivot the handle device from a retracted position to an extended position to cause the retraction cable to retract the locking pin against the bias of the spring.

9. The long reach pole guide apparatus of claim 8 wherein:
the hanger device includes a latch for latching to the fitting; and the apparatus includes a cable connected on one end to the latch and projecting through the interior of the robe to connect with the handle device and configured to, upon rotation of the handle device to the retracted position orientation, disengage the latch device.

10. The long reach pole guide apparatus of claim 8 that includes:

a biasing device in the pole for biasing the handle device to its extended position; and a catch mounted on the handle device for selectively engaging the pole to lock the handle device in its extended position.

11. Long reach pole guide apparatus for guiding a lashing pole alongside a stack of cargo containers, one of which includes a receiver, the apparatus comprising:

an elongated hollow flexible tube for reaching high on the container stack and including a medial section and, upper and lower extremities;

a hanger device mounted to the medial section and including a hook device for engaging the receiver and a locking pin to project therefrom to an extended position engaging the receiver to secure to lock the hanger in position;

a biasing spring biasing the locking pin to the extended position;

a guide device mounted on the upper extremity and including a first foot on one side for bracing against the wall of one of the one container and a yoke on the opposite side for receipt of a lashing pole;

an elongated handle device mounted pivotally to the lower extremity for rotating from an extended position to a retracted position and including on one end a handle and on the opposite end a brace for bracing against the side of one of a lower container;

a catch on the handle device for, when the handle is in the extended position, latching with the pole to hold the handle device in the extended position;

a biasing device for biasing the handle device to its retracted position; and a cable extending from the handle device through the interior of the tube and connected on one end with the locking pin and, on the other end with the handle device, the handle device being operable upon being rotated to its retracted position to connect the cable to retract the locking pin from its extended position.

12. Long reach apparatus for releasable mounting to a fitting on a vertical wall and comprising:

an elongated flexible guide pole having top and bottom extremities, a medial section and opposite first and second sides;

a hanger device on the medial section and including a hook on the first side for releasable hooking to the fitting;

an adjustable mounting device for mounting the hanger device from the pole for adjustment longitudinally therealong;

a tool device on the upper extremity, including a tool disposed on the second side;

a handle device pivotally connected to the lower extremity and pivotable from a retracted to an extended position, and including a foot to, when the handle device is in the extended position, brace against the wall; and a brace on the upper extremity and the brace and foot being constructed to, when the hanger is hooked to the fitting, the pole projecting vertically along the wall, and the handle device rotated to the extended position, flex the upper and lower extremities away from the wall.

* * * * *